Oct. 15, 1935.  H. B. GREENING  2,017,149
ROPE SHEAVE
Filed Aug. 8, 1931

Inventor.
Herald B. Greening.

Patented Oct. 15, 1935

2,017,149

UNITED STATES PATENT OFFICE 2,017,149

ROPE SHEAVE

Herald B. Greening, Hamilton, Ontario, Canada, assignor to Galloway Engineering Company Limited, Hamilton, Ontario, Canada Application August 8, 1931, Serial No. 555,970

2 Claims. (Cl. 74—230.7)

The principal objects of the invention are to effect a material reduction in the wear of wire rope cables operating on grooved sheaves and to equalize the tension on the several lengths of cable operating on a single set of sheaves thereby greatly increasing the life of the cable and also ensuring smoother and more efficient and quiet operation.

A further and important object is to provide a sheave which will wear much longer than the ordinary types of steel sheaves.

A still further object is to enable the speed of elevators using wire rope cables to be materially increased.

The principal feature of the invention consists in the use of a semi-hard, wear resisting rubber liner for the felly of the sheave which will effectively sustain the load on the cables but will yield to local distortion in the cables and prevent the injury of the strands through the flexing of the cable around the sheave, and further to so construct the rubber fabric as to equalize unequal loads on the lengths of cable.

In the accompanying drawing, Figure 1 is a cross-section through the rim of a rope sheave illustrating the application of the present invention.

Figure 1:
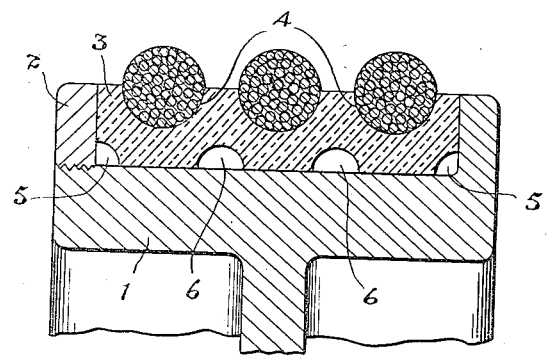
Figure 2:
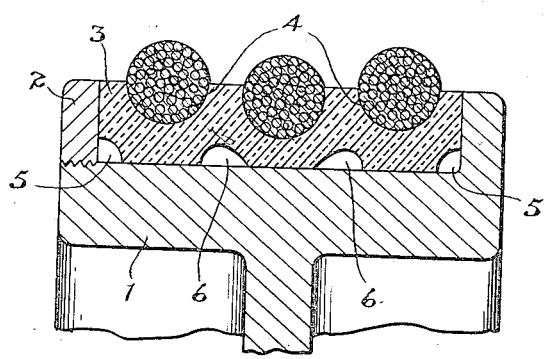
Figure 2 is a cross section similar to Fig. 1, showing the effect of the application of excess stress to one of the rope strands.

The remarkable development of rubber as a wear-resisting element has been very extensively demonstrated particularly in its use in automobile tires, and it has also been found that it has extraordinary wearing qualities when operating in contact with metal.

The present invention proposes the use of a liner of rubber material of the tire stock quality for rope sheaves such as are used in elevator construction.

It is known to the manufacturers of elevators that the wear, both on the cable and the sheave, where metal sheaves are used, is a very pertinent factor of maintenance cost and that the release of tortion created in the cables is a constant cause of undesirable noise, and further, that the constant flexing of the cables in longitudinal tension and lateral compression through contact with the sheave under load, creates ruptures and distortions in the strands which very materially reduce the life of the cable.

Further, it has been determined that the maximum speeds of operation of elevators using metal cables and drums has been reached, such speeds being limited by the friction, the wear, and particularly the results of the impact of the cable strands upon the drum.

The application of a rubber liner or tread to the sheave has been found to very materially reduce these difficulties. Many different forms of rubber treads or liners for sheaves may be developed, but as is shown in the accompanying drawing, the sheave rim 1 is provided with a detachable flange 2 which will enable an endless moulded ring 3 of the desired quality, shape and size of rubber material to be slipped on to the periphery of the sheave and readily secured in position.

The rubber liner here shown is provided with grooves 4 of a diameter substantially corresponding to the diameter of the cable which is to be used therewith. The depth of the grooves will vary in accordance with practice and it will be readily appreciated that the spiral strands of the wire cable will instantaneously impress themselves into the rubber material, thereby providing an exceptionally fine tractive result and it is obvious that any slapping of the ropes will be noiseless if it is not entirely eliminated.

The hard tough rubber stock, from which the liner is made when moulded in circular form and confined by the metal structure of the sheave will not be distorted in its general form but the surface will readily yield to local distortions of the cable and disruption of the metal of the cable is avoided. Further, excess stress in any one length of rope passing over the sheave will, through the extra compression, cause the tread to yield and relieve same. This result may be amplified by providing circumferential cavities in the tread member.

The inner corners of the tread 3 are preferably moulded with these cavities 5 and circumferential cavities 6 are moulded mid-way between the outer peripheral grooves 4.

The arrangement of these cavities around the inner periphery of the rubber liner permits the rubber to compress or flow to either side of a stress applied by extra pressure on the cables caused by the shortening of one of the lengths and the diameter of the bearing surface of the pulley under such shortened cable is automatically reduced, with the ultimate result that the lengths of cable are maintained under a uniform tension.

Figure 3:
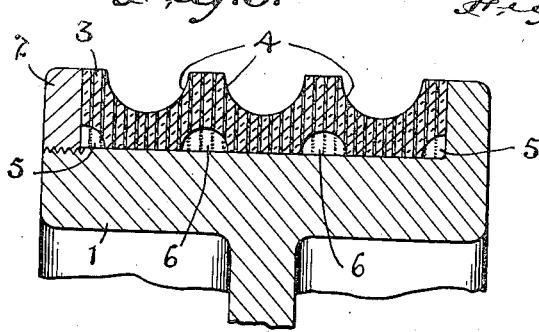
Figure 3 is a cross section similar to Figure 1 showing a reinforcing and wear resisting element incorporated in the rubber tread.

In the form illustrated in Figure 3 the rubber stock is reinforced with fibres, preferably similar to the fibres used in tire construction and the fibres whether loose or in the form of cords are placed so that they are disposed radially, that is, with the ends extending from the inner face outwardly. The fibres are thoroughly impregnated with rubber and may be placed in varying quantity to suit the requirements. The fibres stiffen the rubber mass and offer more resistance to wear.

The applicant in presenting this invention is fully aware that it has been proposed to provide pulleys of various kinds with flexible or yielding surfaces and that rubber has been proposed, but whatever attempts that may have been made to use rubber as a facing for rope sheaves, has not resulted in any practical commercial use.

Tire tread stock, when moulded to form a tread or a liner for a pulley, is provided with suitable grooves of equal diameter to carry the cables of the drive and the structure of the tread band is provided on its inner side with grooves arranged circumferentially which will allow the rubber material to support the normal load uniformly but in the event of an excess stress caused by shortening of any one of the ropes through the peculiarities known to exist with such apparatus, the excess stress will be relieved through the resilience of the rubber and the provision of the cavities arranged on the inward side. These cavities must of course be arranged to provide a rim support of uniform tension to carry the normal load.

The circular rubber rim must be made an accurate fit for the pulley and the pulley must therefore be provided with means to permit the ready placing of the band thereon. This may be accomplished in the manner described and shown by having a removable rim formed on the pulley, but a split pulley may be provided and other forms of construction arranged to enable the slipping on of the moulded endless band.

What I claim as my invention is:

1. An improved sheave for multiple ropes or cables having a peripheral band of resilient rubber material moulded with spaced rope engaging grooves in its outer periphery and formed with cavities on its inner wall spaced between the rope grooves, the rubber material filling the space between the rope and the supporting sheave rim having a body firmness sufficient to sustain normal loads when applied uniformly by said ropes or cables and being capable of being displaced laterally under abnormal pressures to reduce the effective surface diameter of the rope groove subject to the greatest strain, whereby said resilient rubber band acts as a yielding compensating support for said ropes or cables to distribute the load therebetween.

2. An improved sheave for equalizing the load on multiple ropes or cables, said sheave having a resilient band of rubber material formed with spaced peripheral grooves to receive the multiple ropes or cables, and having radially disposed fibers incorporated therein, the band material directly engaging the sheave rim to form a direct support for the cables and having grooves on the inner face offset from the rope grooves, whereby on the load on any one of said ropes or cables being excessive the local portion of the resilient rubber body directly below said certain rope or cable will upon compression displace laterally to each side into the said offset recesses to relieve the excessive strain on the one cable and effect a distribution of the load on the remaining cables.

HERALD B. GREENING.